United States Patent [19]

Huju

[11] Patent Number: 4,798,503
[45] Date of Patent: Jan. 17, 1989

[54] TENON FORMING TOOL

[76] Inventor: Brian M. Huju, 1650 Deer Lake Way, Grand Rapids, Minn. 55744

[21] Appl. No.: 152,881

[22] Filed: Feb. 5, 1988

[51] Int. Cl.⁴ .............................................. B23B 51/00
[52] U.S. Cl. ..................................... 408/211; 408/67; 408/200; 408/201; 408/204; 408/209; 408/713; 144/3 R; 144/30; 144/219
[58] Field of Search ............ 408/199, 200, 201, 203.5, 408/204, 205, 206, 207, 209, 211, 214, 223, 224, 225, 227, 67, 68, 713; 144/3 R, 4, 30, 73, 74, 219, 220

[56] References Cited

U.S. PATENT DOCUMENTS

| | | | |
|---|---|---|---|
| 72,436 | 12/1867 | Wippo | 408/206 |
| 1,551,915 | 9/1925 | Upson . | |
| 1,593,654 | 7/1926 | Ermoshkin | 408/214 |
| 1,647,395 | 11/1927 | Costello . | |
| 1,745,779 | 2/1930 | Carson et al. | 408/68 |
| 2,800,812 | 7/1957 | Mueller et al. . | |
| 2,804,895 | 9/1957 | Clement . | |
| 3,365,773 | 1/1968 | Olsen . | |
| 3,673,656 | 7/1972 | Gerchow | 408/203.5 |
| 3,817,649 | 6/1974 | Medney | 408/211 |
| 3,945,753 | 3/1976 | Byers et al. | 408/201 |
| 4,205,493 | 6/1980 | Kim | 51/170 |
| 4,295,763 | 10/1981 | Cunniff | 408/203.5 |

FOREIGN PATENT DOCUMENTS 2104808  3/1983  United Kingdom ............... 408/204

Primary Examiner—Gil Weidenfeld
Assistant Examiner—Daniel W. Howell
Attorney, Agent, or Firm—Leo Gregory

[57] ABSTRACT

A tenon forming tool which is an attachment for a powered hand drill.

2 Claims, 2 Drawing Sheets

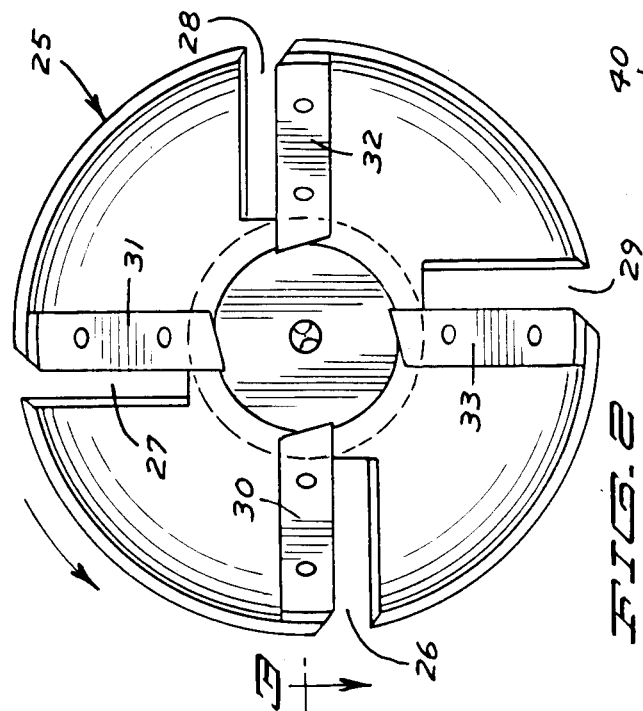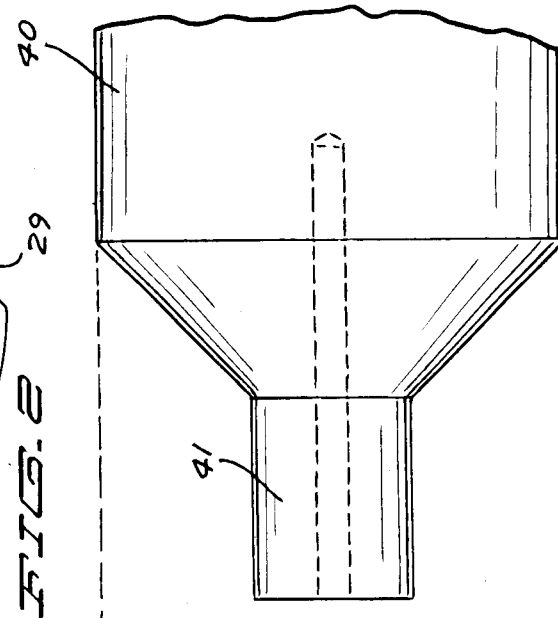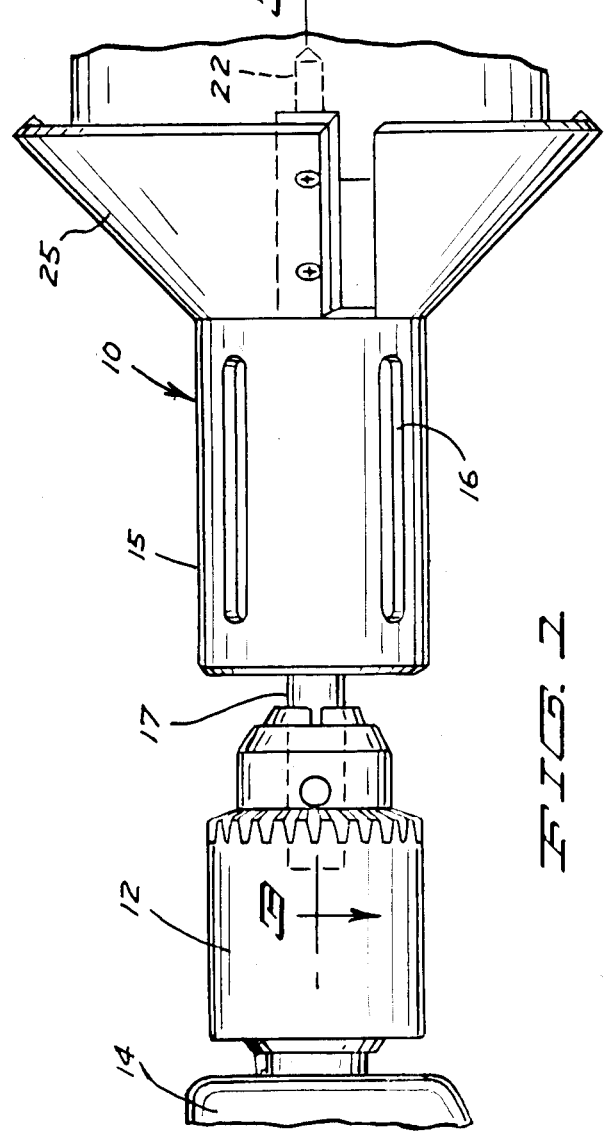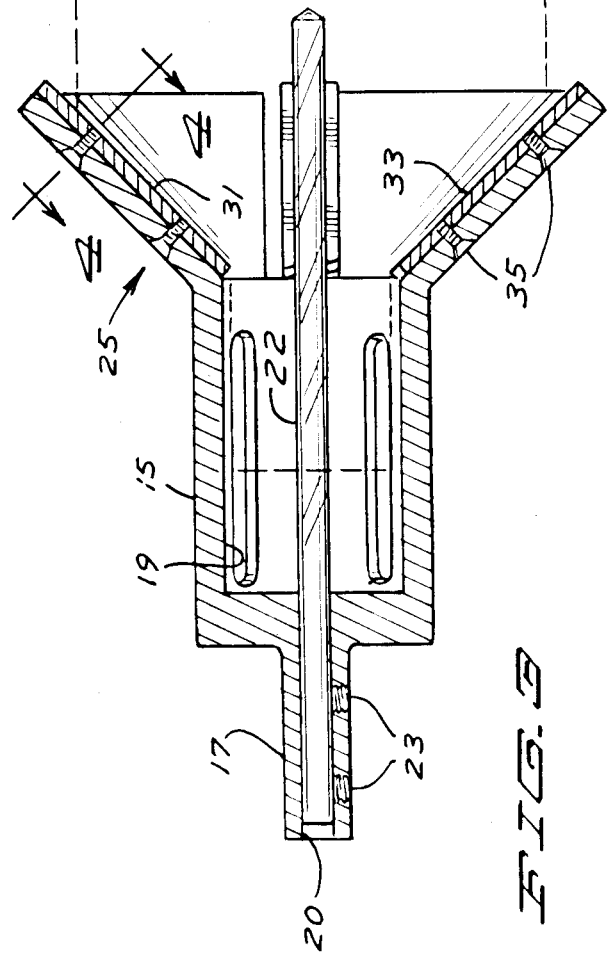

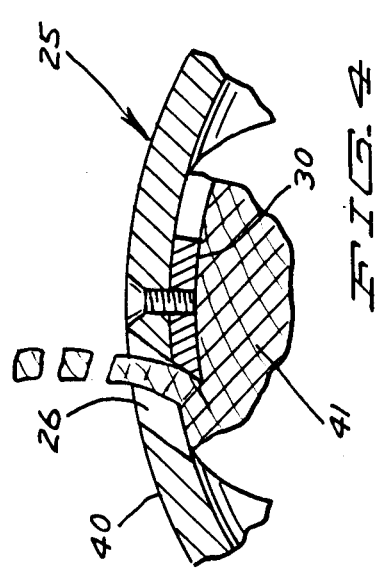
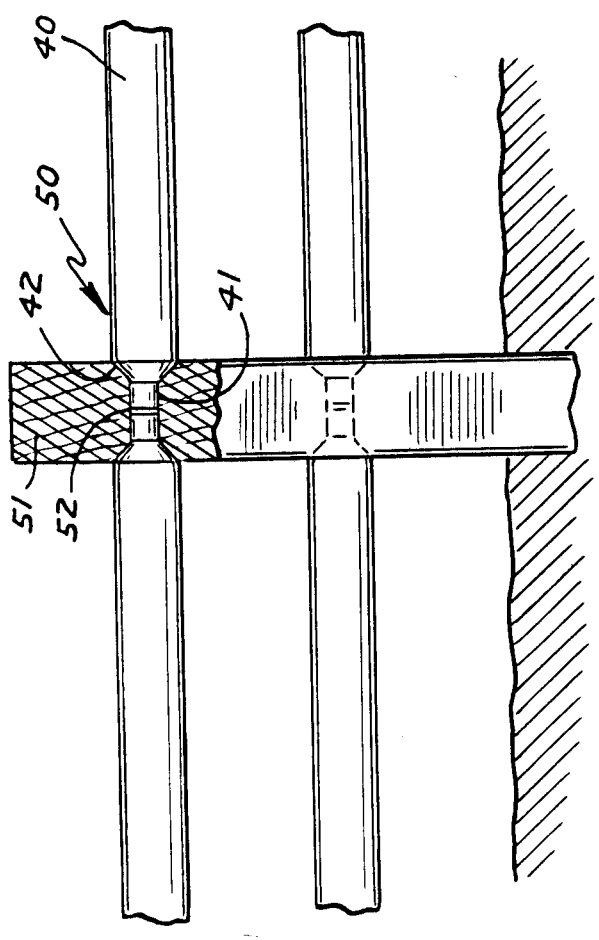
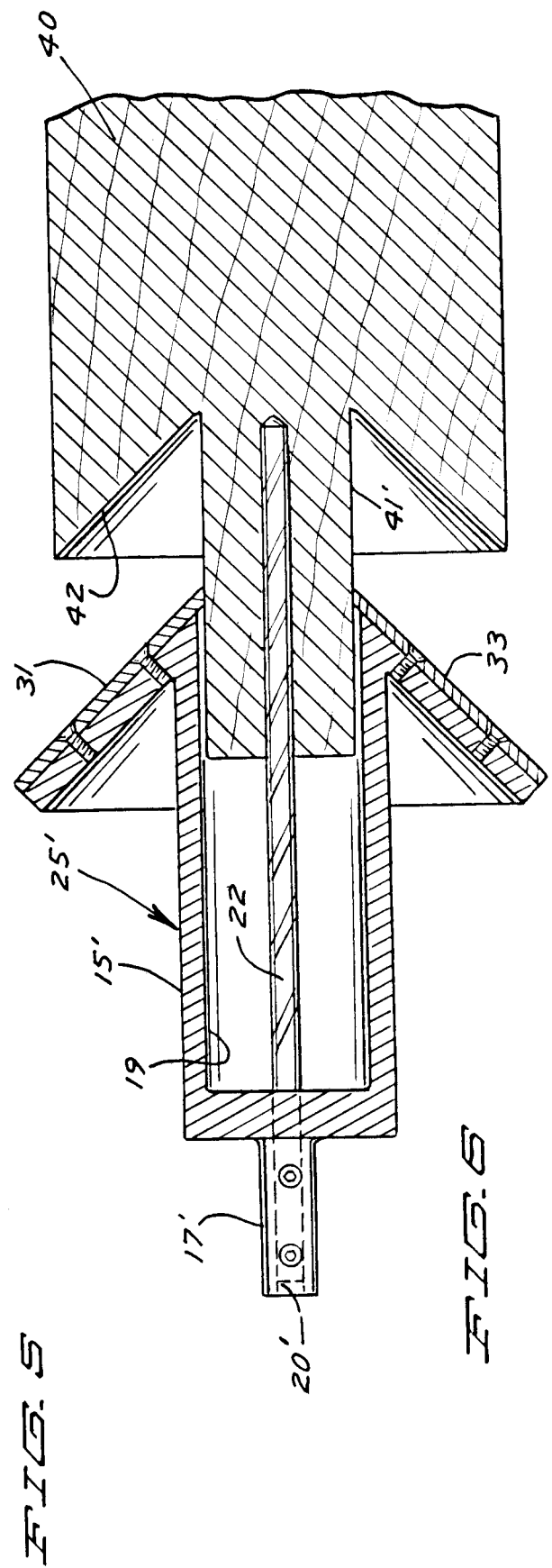

TENON FORMING TOOL

BACKGROUND OF THE INVENTION

1. Field of Invention

This invention relates to a tenon forming tool as a hand drill attachment.

2. Description of the Previous Art

The invention herein relates to a hand drill attachment for cutting tenons onto posts as in erecting a wooden post type fence.

In ordinary practice it requires a wood working shop operation to form tenons on posts such as to be used to form and erect a wooden post fence. The tools generally used are floor mounted power operated tools which are not readily transportable, if at all, and require the posts to be modified to be brought to the site of the machine, and this requires that the number of posts be precalculated or more than one trip may be involved to modify the required number of posts.

It is very desirable to have a portable tool, whereby the preparation of the posts in forming tenons on the ends thereof can all be done at the site of erection of the fence, for example, or for whatever other purpose such posts may serve.

SUMMARY OF THE INVENTION

The invention herein relates to fashioning tenons on the ends of posts by providing a powered portable or hand drill which can be used at the work site and which is formed to be an attachment for such a drill.

Portable drills are readily available which have ample power to drive an attached wood working tool as for the purpose of cutting tenons.

The tenon cutting attachment herein is particularly adapted to be mounted onto and to be operated by a powered hand drill.

In addition to use of the invention herein to form tenons on posts for fencing, the same is also very convenient for cutting tenons for post members as on a deck railing and for forming tenons on spindles such as may be used on chairs and other items of furniture.

It is the object of this invention therefore to provide a tool for cutting a tenon onto an article such as a post or a spindle, the tool being arranged and constructed to be an attachment for a power operated hand drill.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in side elevation of the invention in operating position in connection with a broken away portion of a work piece;

FIG. 2 is a view in front elevation;

FIG. 3 is a view in horizontal section taken on line 3—3 of FIG. 1 as indicated with an exploded view of a work piece;

FIG. 4 is a fragmentary sectional view taken on line 4—4 of FIG. 3 as indicated;

FIG. 5 is a broken view in elevation and partly in section of a work piece positioned as a finished product; and FIG. 6 is a view in longitudinal vertical section showing a modification in connection with a work piece.

DESCRIPTION OF A PREFERRED EMBODIMENT

Referring to the drawings, the invention herein comprising a tenon forming tool formed as a drill attachment is indicated generally by the reference numeral 10 and is shown in FIG. 1 attached to a drill chuck 12 of a drill indicated at 14.

Said tool has a cylindrical housing or hub 15 which has a plurality of elongated clean out slots 16 spaced thereabout. Extending rearwardly of said hub integral therewith is a shank 17 which is received into the drill chuck 12. Said hub has a bore 19 extending substantially therethrough which is reduced to a counterbore 20 which extends through the shank 17.

A pilot drill 22 is disposed through said bore and counterbore having its rearward portion secured within said counterbore 20 by set screws 23, said shank being tapped to receive said screws.

Said hub has a flared forwardly extending head portion 25 which is preferably angled in the range of 45° to 60°.

Said head portion in the present embodiment is generally frusto conical in form having as here shown a plurality of radial clean out slots 26–29 equally spaced thereabout and mounted above the top portion of each slot are cutting blades 30–33. It will be understood that the cutting edges of said blades will be appropriately angled.

Said blades are removably secured by screws 35.

In operation, the tenon forming tool herein and a drill, which may be self-powered, are readily taken to a work site for the erection, for example, of a post railing fence such as indicated at 50 in FIG. 5.

In FIG. 3, there is indicated in an expanded view, the work product of a post 40 having a tenon 41 formed thereon by the tool herein. In FIG. 4, in a fragmentary view a blade 30 of the tool herein is shown reducing the end of the post 40 to produce a tenon 41 and the cut wood is discharged through the clean out slot 26.

In FIG. 5, there is indicated an assembly 50 of a vertical post 51 and horizontal posts represented by the post 40 having its tenon 41 and the shoulder 42, disposed into the mortise 52 in the erection of a fence.

Referring to FIG. 6, a modification of the tool herein is indicated in which the tool is of identical structure as that above described as to its hub which is indicated as 15' and its shank as 17' and having an internal bore 19' with a counterbore 20' in said shank and the pilot drill is indicated as 22.

The change in structure is present in the head portion 25' which is tapered forwardly and flared rearwardly but in other respects having the same structural head portion of which its cutters or blades are indicated by the blades 31 and 33 and the same will have the clean out slots above described though not shown. Here the tenon is cut to have a recessed shoulder 42' instead of a rearwardly upwardly angled shoulder whereby there is a very tight sealed fitting between the post and the mortise 52 unto which its tenon 41' is disposed.

It is believed to be obvious that the blades 30–33 reduce the engaged end of a post reducing the same to a diameter to be received into the bore 19 with the tenon being cut to be the length of said bore or to any lesser desired degree.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is:

1. A tenon forming tool as an attachment for a powered hand drill, having in combination, an elongated cylindrical body portion, a shank of reduced diameter relative to said body portion being integral therewith and extending rearwardly thereof, a bore in said body portion of a diameter to receive a tenon to be formed and having a depth corresponding at least to the length of a tenon to be formed, a counterbore in said shank extending from said bore in said body portion and communicating therewith, a face portion of said body portion extending forwardly thereof and flaring outwardly thereof, a plurality of radial slots in said face portion, a cutting blade mounted adjacent each slot position to have the blade cuttings discharged therethrough, a pilot drill disposed axially of said bore and extending into said counterbore, a plurality of slots spaced about said body portion, and means in connection with said shank securing said drill.

2. A tenon forming tool as an attachment for a powered hand drill, having in combination, an elongated cylindrical body portion, a shank of reduced diameter relative to said body portion being integral therewith and extending rearwardly thereof, a bore in said body portion of a diameter to receive a tenon to be formed and having a depth corresponding at least to the length of the tenon to be formed, a counterbore in said shank extending from said bore in said body portion and communicating therewith, a face portion of said body portion extending outwardly laterally thereof, a plurality of radial slots in said face portion, a cutting blade mounted adjacent each slot position to have the blade cuttings discharged therethrough, a pilot drill disposed axially of said bore and extending into said counterbore, a plurality of slots spaced about said body portion, and means in connection with said shank securing said drill.

* * * * *